(12) United States Patent
Tsutsui et al.

(10) Patent No.: US 9,000,630 B2
(45) Date of Patent: Apr. 7, 2015

(54) MOTOR INCLUDING HEAT RADIATING RESIN

(71) Applicants: Kobe Steel, Ltd., Kobe-shi (JP);
Kobelco Construction Machinery Co., Ltd., Hiroshima-shi (JP)

(72) Inventors: Akira Tsutsui, Kobe (JP); Seiji Saiki, Hiroshima (JP); Kazushige Koiwai, Hiroshima (JP); Akira Nakazumi, Hiroshima (JP)

(73) Assignees: Kobe Steel, Ltd., Kobe-shi (JP);
Kobelco Construction Machinery Co., Ltd., Hiroshima-shi (JP)

( * ) Notice: Subject to any disclaimer, the term of this patent is extended or adjusted under 35 U.S.C. 154(b) by 380 days.

(21) Appl. No.: 13/660,433

(22) Filed: Oct. 25, 2012

(65) Prior Publication Data
US 2013/0106210 A1 May 2, 2013

(30) Foreign Application Priority Data
Oct. 27, 2011 (JP) ................................. 2011-235849

(51) Int. Cl.
*H02K 5/128* (2006.01)
*H02K 3/38* (2006.01)

(52) U.S. Cl.
CPC . *H02K 3/38* (2013.01); *H02K 5/128* (2013.01)

(58) Field of Classification Search
None
See application file for complete search history.

(56) References Cited

U.S. PATENT DOCUMENTS

| | | | | |
|---|---|---|---|---|
| 3,075,250 | A | * | 1/1963 | Strohm et al. ............. 264/272.2 |
| 3,638,055 | A | * | 1/1972 | Zimmermann ................. 310/43 |
| 4,048,530 | A | * | 9/1977 | Kaufman, Jr. ................. 310/89 |
| 6,040,647 | A | * | 3/2000 | Brown et al. .................... 310/89 |
| 7,042,124 | B2 | * | 5/2006 | Puterbaugh et al. ............ 310/89 |
| 2009/0152491 | A1 | | 6/2009 | Saga |
| 2009/0322180 | A1 | | 12/2009 | Nonaka |

FOREIGN PATENT DOCUMENTS

| | | |
|---|---|---|
| CN | 101490932 A | 7/2009 |
| CN | 101640440 A | 2/2010 |
| CN | 101669267 A | 3/2010 |
| CN | 101861353 A | 10/2010 |
| JP | 2007-143245 | 6/2007 |
| WO | WO 2008/007052 A2 | 1/2008 |

OTHER PUBLICATIONS

Combined Chinese Office Action and Search Report issued Aug. 4, 2014, in Chinese Patent Application No. 201210418192.9 with English Summary of Office Action and with English translation of category of cited documents.

* cited by examiner

*Primary Examiner* — Tran Nguyen
(74) *Attorney, Agent, or Firm* — Oblon, McClelland, Maier & Neustadt, L.L.P.

(57) ABSTRACT

Provided is a motor including a rotor, a stator having a stator core and a coil, a stator frame, an end cover, first and second bearings, and a heat radiating resin in the stator frame. The coil includes first and second end portions projecting oppositely and axially. The stator frame includes a peripheral wall and an end wall, whose respective central parts form first and second boss portions holding the first and second bearings respectively. The heat radiating resin includes a first resin part covering the first end portion and closely contacting an inner surface of the stator frame, and a second resin part covering the second end portion and separating from an outer peripheral surface of the second boss portion. The first resin part has a portion between the first end portion and the first boss portion, the portion having a greater thickness than that of the other.

3 Claims, 3 Drawing Sheets

MOTOR INCLUDING HEAT RADIATING RESIN

BACKGROUND OF THE INVENTION

1. Field of the Invention

The present invention relates to a motor, for example, used for slewing in a construction machine.

2. Description of the Background Art

There is conventionally known a motor used for a construction machine or the like, the machine including a rotor, a stator with a coil that forms a magnetic field for rotating the rotor, and a stator frame that accommodates the stator. This type of motor can form magnetic field by current applied to the coil. However, in the case where comparatively large current is applied to the coil to thereby remarkably generate heat, it is required to dissipate the generated heat efficiently to the exterior of the stator frame to cool the coil.

As means for cooling such a coil, Japanese Patent Application Publication No. 2007-143245 discloses using a cooling resin including fillers exhibiting high thermal conductivity. Specifically, this document discloses a motor having a rotor that includes a permanent magnet, a stator that includes a coil for rotating the rotor, and a motor frame (a stator frame) that accommodates and holds the rotor and the stator, wherein the cooling resin is charged into the interior of the motor frame. The cooling resin is disposed so as to be interposed between an outer surface of the coil and an inner surface of the motor frame to function to advance thermal conduction from the coil to the motor frame.

In this conventional motor, however, as will be described below, it is difficult to determine a thickness of the resin charged into the stator frame. Although the resin includes fillers exhibiting high thermal conductivity, an overall thermal conductivity of the resin is lower than that of a material (typically a metal) constituting the stator frame, and therefore the thickness of the resin is required to be possibly reduced in order to advance heat radiation from the coil. On the other hand, the reduction in the thickness causes the resin to be easily cracked by external force due to vibration of the rotor including an output shaft, and so on. The cracks may generate fragments of the resin, the fragments having a possibility of being caught in the rotor to cause an operation defect therein. Besides, increasing content of the fillers to secure high thermal conductivity without reducing the thickness of the resin involves a large cost increase. These problems are particularly evident in a type of motor where large current is applied to the coil and a large mechanical load is exerted on the rotor, for example, as a motor for slewing an upper slewing structure of a construction machine.

SUMMARY OF THE INVENTION

An object of the present invention is to provide a motor which comprises a stator including a coil, a stator frame accommodating the stator and a heat radiating resin disposed in the stator frame, the motor being capable of effectively cooling the coil without a large increase in cost while avoiding operation defects in a rotor caused by cracks in the resin.

To achieve this object, the present inventors have focused on the following point in relation to a load exerted on the motor. In a motor including a stator frame and an end cover, as described above, an end portion on the stator frame side (an end portion on an opposite side to the end cover) of two axial end portions of the rotor is typically selected as a load side end portion which should be connected to a mechanical load, because the stator frame possesses greater strength and greater rigidity than that of the end cover. Hence, a large load is more likely to be exerted on the stator frame side of the motor, the side opposite to the end cover, than on the end cover side.

The present invention has been designed in consideration of this point, thus providing a motor having the following configuration. The motor includes: a rotor capable of rotating about a specific rotary central axis, the rotor including one axial end portion as a load side end portion adapted to be connected to a mechanical load; a stator including a stator core disposed around the rotor and a coil supported by the stator core, the stator adapted to form a magnetic field that applies a rotary force to the rotor when the coil is energized; a stator frame having an opening on an opposite side to the load side end portion of the rotor, the opening directed parallel to the axial direction of the rotor, the stator frame accommodating the stator and holding the stator core; an end cover attached to the stator frame so as to close the opening in the stator frame; a first bearing and a second bearing held by the stator frame and the end cover, respectively, to rotatably support the rotor in respective axially different positions; and a heat radiating resin disposed in the stator frame so as to transfer heat generated in the coil to the stator frame to advance heat radiation. The coil of the stator includes a first end portion projecting beyond the stator core toward the load side end portion in the axial direction of the rotor and a second end portion projecting beyond the stator core in a direction opposite to the first end portion in the axial direction of the rotor. The stator frame includes a peripheral wall surrounding the stator with a radial gap between the peripheral wall and respective outer surfaces of the first and second end portions of the coil, and an end wall located on an opposite side to the opening in the stator frame and integrally connected to the peripheral wall. The end wall includes a central part projecting inwardly in the axial direction of the rotor beyond a peripheral part thereof to form a first boss portion that holds the first bearing. The end cover includes a central part projecting inward in the axial direction of the rotor beyond a peripheral part thereof to form a second boss portion that holds the second bearing.

The stator is disposed in the stator frame such that the first end portion of the coil is interposed between the first boss portion and the peripheral wall of the stator frame and the second end portion is interposed between the second boss portion and the peripheral wall of the stator frame.

The heat radiating resin includes a first resin part covering a surface of the first end portion of the coil and making close contact with an inner surface of the stator frame and a second resin part covering a surface of the second end portion of the coil and separating from an outer peripheral surface of the second boss portion of the end cover, the first resin part including an inner-side interposed portion interposed between an inner surface of the first end portion of the coil and an outer peripheral surface of the first boss portion, the heat radiating resin having such a shape that the inner-side interposed portion has a thickness greater than a thickness of other portion than the inner-side interposed portion in the heat radiating resin.

DESCRIPTION OF THE PREFERRED EMBODIMENTS

Figure 1:
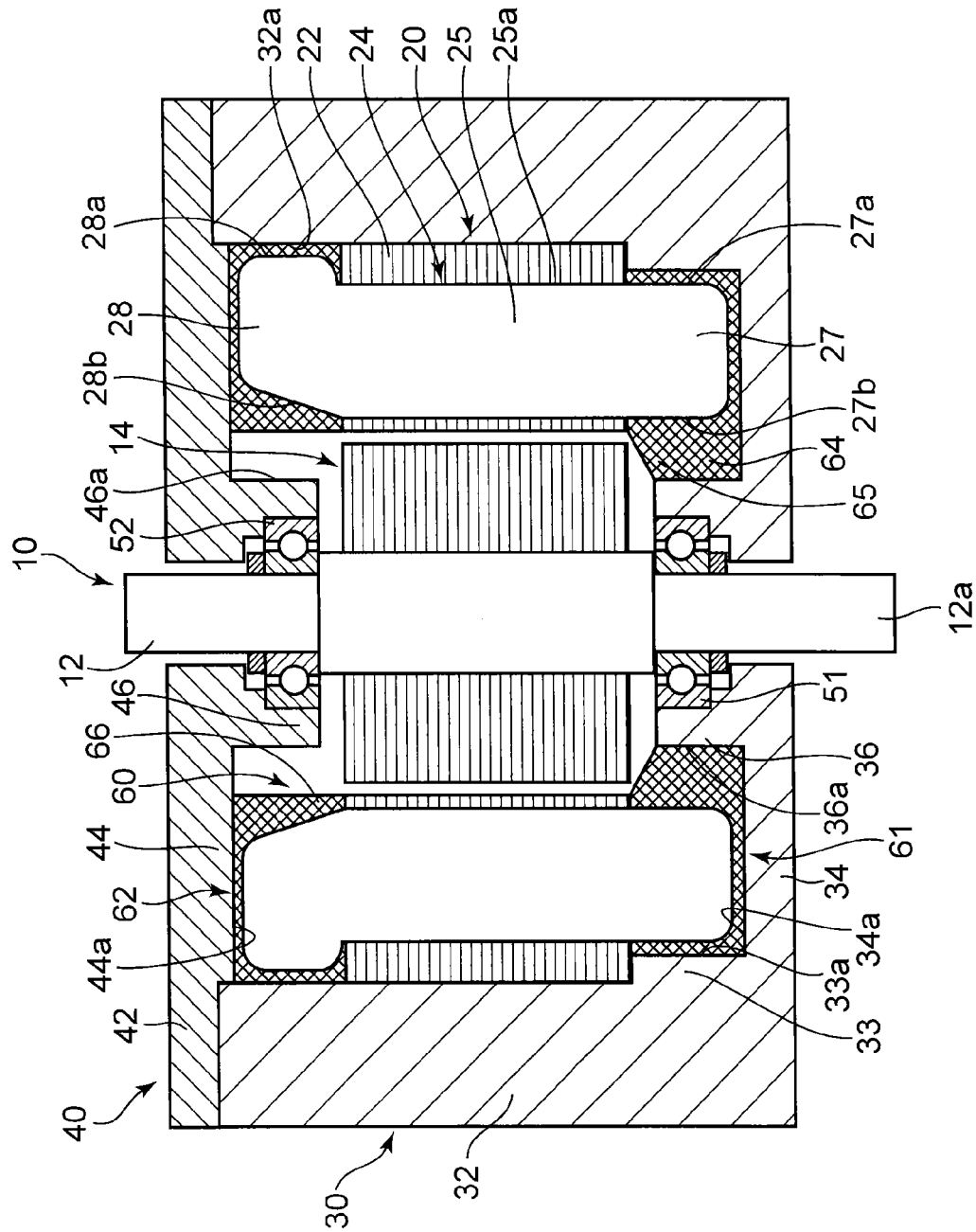
FIG. 1 is a sectional front view of a motor according to a first embodiment of the present invention.

There will be described an embodiment of the present invention with reference to FIGS. 1 and 2. A motor according to this embodiment is suitable for driving a comparatively heavy object such as an upper portion slewing body of a construction machine, for example, while there are no limitations on the object driven by the motor according to the present invention.

The motor according to this embodiment includes a rotor 10, a stator 20, a stator frame 30, an end cover 40, a first bearing 51 and a second bearing 52, and a heat radiating resin 60.

Figure 2:
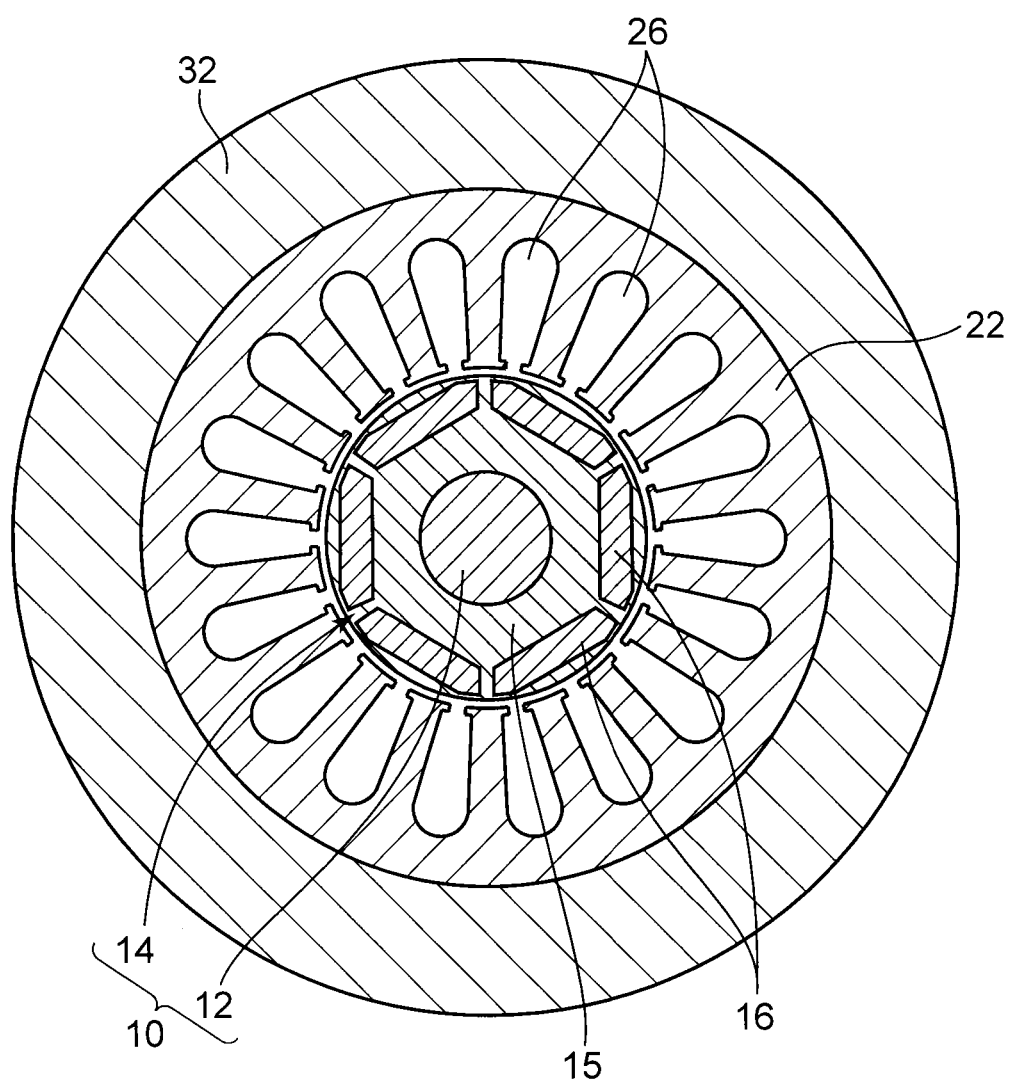
FIG. 2 is a sectional plan view of the motor except a coil thereof.

The rotor 10 is supported by the stator frame 30 and the two bearings 51, 52 so as to be capable of rotating about a specific rotary central axis (a vertical axis in FIG. 1). The rotor 10 includes a rotary shaft 12 extending along the rotary central axis and a magnet portion 14 disposed around an intermediate part of the rotary shaft 12, the rotary shaft 12 and the magnet portion 14 being joined to each other so as to be integrally rotated. The magnet portion 14 includes an iron core 15 of cylindrical column shape and a plurality of permanent magnets 16 buried in the iron core 15. The iron core 15 is formed of, for example, a plurality of steel plates laminated in an axial direction of the rotor 10, and the permanent magnets 16 are buried in the iron core 15 so as to be arranged in series in a circumferential direction of the rotor 10.

Thus, the rotor 10 according to this embodiment constitutes a so-called permanent magnet synchronous motor. Meanwhile, the rotor according to the present invention is not limited thereto but may be, for example, one in which permanent magnets are disposed in an outer peripheral surface of an iron core (i.e. a rotor constituting a surface magnet type synchronous motor) or a rotor forming a so-called squirrel cage rotor (i.e. a rotor constituting an induction motor).

One end portion of the rotary shaft 12 (a lower side end portion in FIG. 1) serves as a load side end portion 12a to be connected to a mechanical load. For example, in the case of installing the motor in an upper slewing structure of a construction machine such as a hydraulic excavator having a lower portion traveling body and the upper slewing structure in order to slew the upper slewing structure relative to the lower portion traveling body, connected to the load side end portion 12a is a pinion to be meshed to a ring gear fixed to the lower portion traveling body.

The first bearing 51 and the second bearing 52 according to this embodiment are formed of respective roller bearings each having an inner ring and an outer ring, disposed so as to rotatably support the rotary shaft 12 of the rotor 10 in respective axially different positions. The first bearing 51 is so disposed as to support a first part of the rotary shaft 12, the first part being close to the load side end portion 12a; specifically, the inner ring of the first bearing 51 is fixed to the first part while the outer ring thereof is fixed to the stator frame 30. The second bearing 52 is so disposed as to support a second part of the rotary shaft 12, the second part located on an opposite side of the magnet portion 14 to the load side end portion 12a; specifically, the inner ring of the second bearing 52 is fixed to the second part while the outer ring is fixed to the end cover 40.

The stator 20 includes a cylindrical stator core 22 disposed around the rotor 10, specifically, around the magnet portion 14 in this embodiment, and a coil 24 supported by the stator core 22. The stator core 22 is formed of, for example, a plurality of steel plates laminated in the axial direction of the rotor 10 and has an inner peripheral part formed with a plurality of slots 26 arranged in the circumferential direction.

The coil 24, which is formed of wires wound around the stator core 22 so as to be accommodated in respective slots 26, forms a magnetic field that applies rotary force to the magnet portion 14 of the rotor 10, when energized. The coil 24 includes a first end portion 27 projecting beyond the stator core 22 in the axial direction of the rotor 10 toward the load side end portion 12a, that is, downwardly in FIG. 1, and a second end portion 28 projecting beyond the stator core 22 in the axial direction of the rotor 10 to an opposite side to the first end portion 27, that is, upwardly in FIG. 1.

The stator frame 30 is made of a metallic material exhibiting superior thermal conductivity and strength, such as a steel material, and has an opening on the opposite side to the load side end portion 12a of the rotor 10, that is, the upper side in FIG. 1, the opening directed parallel to the axial direction of the rotor 10, that is, directed upwardly in FIG. 1. The stator frame 30 is adapted to receive the stator 20 inserted through the opening and hold the stator core 22 thereof.

Specifically, the stator frame 30 includes a peripheral wall 32 and an end wall 34, which are integrally formed.

The peripheral wall 32 surrounds the stator 20 with a radial gap between the peripheral wall 32 and respective outer surfaces 27a, 28a of the first and second end portions 27, 28 of the coil 24. In this embodiment, the stator core 22 is fixed in the stator frame 30 by being press-fitted into an inner side of the peripheral wall 32, while the stator core 22 may be fixed to the stator frame 30 by use of a fastening tool such as a bolt.

A lower portion of the peripheral wall 32 according to this embodiment, that is, a portion vertically offset to the first bearing 51, forms a step portion 33. The step portion 33 has a smaller inner diameter than that of a part other than the step portion 33 in the peripheral wall 32, that is, a part on an upper side of the step portion 33, to inwardly project. The step portion 33 determines an axial position of the stator core 22 by making contact with a lower end of the stator core 22.

The end wall 34 is located on an opposite side to the opening in the stator frame 30 (the lower side in FIG. 1), that is, on the side close to the load side end portion 12a of the rotor 10. The end wall 34 has a circular shape, whose peripheral edge is integrally connected to the lower end of the peripheral wall 32. The end wall 34 has a central part constituting a first boss portion 36 for holding the first bearing 51. The first boss portion 36 projects inwardly (upwardly in FIG. 1) along the axial direction of the rotor 10 beyond a peripheral part thereof, and includes an upper portion surrounding the first bearing 51 and a lower portion surrounding the rotary shaft 12 projecting outwardly (downwardly in FIG. 1) beyond the first bearing 51, the upper and lower portions being integrally formed. Specifically, the outer ring of the first bearing 51 is press-fitted into an inner side of the upper portion of the first boss portion 36 to be thus fixed.

Similarly to the stator frame 30, the end cover 40 is formed of a metallic material exhibiting superior thermal conductivity and strength, such as a steel material, having a shape capable of being attached to an opening side end portion (an upper end portion in FIG. 1) of the stator frame 30 so as to close the opening in the stator frame 30. Specifically, the entire end cover 40 is substantially disc-shaped, including an outer peripheral portion 42, an intermediate portion 44, and a second boss portion 46, which are integrally formed.

The outer peripheral portion 42 is configured to come into contact with the peripheral wall 32 of the stator frame 30 in the rotor axis direction during the attachment operation of the end cover 40 to the stator frame 30, and fixed by a bolt or the like. The intermediate portion 44 projects inwardly in the rotor axis direction, that is, downwardly in FIG. 1, beyond the outer peripheral portion 42, having an outer diameter substantially equal to an inner diameter of the peripheral wall 32. The intermediate portion 44 is thus configured to be inserted into the peripheral wall 32 so as to be fitted to the inner surface of the peripheral wall 32 with little gap.

The second boss portion 46 projects inwardly in the rotor axis direction, that is, downwardly in FIG. 1, beyond a peripheral part thereof, namely, the intermediate portion 44. The second boss portion 46 includes a lower portion surrounding the second bearing 52 and an upper portion surrounding the rotary shaft 12 which projects outwardly, that is, upwardly in FIG. 1, beyond the second bearing 52, the lower and upper portions being integrally formed. The outer ring of the second bearing 52 is press-fitted into an inner side of the lower portion of the second boss portion 46 to be fixed.

The stator 20 is disposed in the stator frame 30 such that: the first end portion 27 of the coil 24 is interposed between an outer peripheral surface 36a of the first boss portion 36 and an inner peripheral surface 33a of the step portion 33 of the peripheral wall 32; and, accompanying the attachment of the end cover 40 to the stator frame 30, the second end portion 28 is interposed between an outer peripheral surface 46a of the second boss portion 46 and an inner peripheral surface 32a of the upper end portion of the peripheral wall 32.

The heat radiating resin 60, made of a material exhibiting lower thermal conductivity than that of the metallic material forming the stator frame 30 and the end cover 40 but comparatively high thermal conductivity for a resin, is disposed in the stator frame 30 so as to transfer heat generated by the energized coil 24 to thereby advance the heat radiation.

Can be favorably used for the heat radiating resin 60 is, for example, epoxy resin or unsaturated polyester resin. These resins, each possessing much higher thermal conductivity (1.2 to 1.5 W/m·k) than that of air (0.024 to 0.025 W/m·k), can advance heat radiation from the coil 24 as compared with the case of interposition of an air layer alone between the coil 24 and the stator frame 30. Moreover, the heat radiation can possess further enhanced heat radiation advancement effect if the resin contains fillers exhibiting high thermal conductivity (5 to 10 W/m·k). Even in this case, the characteristic shape of the heat radiating resin 60 as will be described below, that is, a shape of high heat radiation advancement effect, permits a required amount of filler to be reduced, thereby contributing to reduced costs.

Specifically, the heat radiating resin 60 includes a first resin part 61 and a second resin part 62. The first resin part 61 has a shape of covering a surface of the first end portion 27 of the coil 24 and making close contact with an inner surface of the stator frame 30 (in this embodiment, the inner peripheral surface 33a of the step portion 33, an inner surface 34a of the end wall 34, and the outer peripheral surface 36a of the first boss portion 36). The second resin part 62 has a shape of covering a surface of the second end portion 28 of the coil 24 and separating from the outer peripheral surface 46a of the second boss portion 46 of the end cover 40. In the end cover 40, an inner surface 44a of the intermediate portion 44, that is, the peripheral part of the second boss portion 46, may be either separate from or in contact with the second resin part 62. In the case of priority to reliable prevention of the second resin part 62 from cracking, preferable is that the inner surface 44a of the intermediate portion 44 is separate from the second resin part 62, while, in the case of priority to improvement of heat radiation, preferable is that the inner surface 44a makes contact with the second resin part 62.

The heat radiating resin 60 has such a shape that the first resin part 61 thereof includes an inner-side interposed portion 64 interposed between an inner surface 27b of the first end portion 27 of the coil 24 and the outer peripheral surface 36a of the first boss portion 36, the inner-side interposed portion 64 having a greater thickness (radial direction thickness) than the other portion of the heat radiating resin 60. Besides, the heat radiating resin 60 has a covering portion 65 between the inner-side interposed portion 64 and an inside end of the stator core 22, the covering portion 65 being so shaped as to have a thickness decreasing continuously from the inner-side interposed portion 64 toward the stator core 22 (toward the upper side in FIG. 1).

Furthermore, the coil 24 according to this embodiment has a shape partially bulging such that an entire outer surface 28a of the second end portion 28 is radially positioned outwardly from an outer surface 25a of a part 25 of the coil 24, the part 25 disposed in the stator core 22 (in this embodiment, radially positioned outwardly from the inner peripheral surface 33a of the step portion 33), in other words, such that an entire outer surface 28a of the second end portion 28 is close to the inner peripheral surface 32a of the upper portion of the peripheral wall 32.

The motor thus including the heat radiating resin 60 can be assembled, for example, by the following steps.

1) The stator 20 is loaded into the stator frame 30 through the opening therein (the upper side opening in FIG. 1). In this embodiment, the stator 20 is inserted into the stator frame 30 until the lower end of the stator core 22 impinges on the upper end of the step portion 33 of the stator frame 30.
2) Into the inner side of the stator 20A is inserted a molding die having an outer peripheral surface comforting to respective shapes of the inner surface of the heat radiating resin 60 to be molded and the outer peripheral surfaces of the two bearings 51, 52.
3) Resin constituting the heat radiating resin 60, in a fluid state, is injected into a space inside the stator frame 30, that is, a space in the stator frame 30 around the stator 20, and then cured.
4) Following the cure of the heat radiating resin 60, the die is removed, and in place thereof, an assembly of the rotor 10 and the two bearings 51, 52 is loaded into the stator frame 30.
5) The end cover 40 is attached to the open end (the upper end in FIG. 1) of the stator frame 30 and fixed by a bolt or the like.

According to the motor described above, the characteristic shape of the heat radiating resin 60 allows both of preventing the rotor 10 from operation defects due to cracks in the heat radiating resin 60 and securing a superior heat radiation performance to be achieved, specifically, as follows.

First, in the first resin part 61 of the heat radiating resin 60, that is, the part on the side close to the load side end portion 12a of the rotor 10, the inner-side interposed portion 64 interposed between the inner surface 27b of the first end portion 27 of the coil 24 and the outer peripheral surface 36a of the first boss portion 36 makes close contact with the inner surface 27b, the outer peripheral surface 36a, and further the inner surface 34a of the end wall 34, while being given a greater thickness than the other portion; this prevents the inner-side interposed portion 64 from cracks due to a load exerted on the inner-side interposed portion 64, the exerted load being a load applied to the first boss portion 36, for example, a load generated by vibration of the rotor 10, and thereby prevents that the fragments of the heat radiating resin 60 generated by the cracks cause operation defects in the rotor 10. In addition, since the inner-side interposed portion 64 of the first resin part 61 is far from the outer surface of the stator frame 30 and therefore plays a comparatively small role in radiating heat to the exterior of the stator frame 30, the influence which the increase in the thickness of the inner-side interposed portion 64 exerts on the overall heat radiation performance of the motor is small.

On the other hand, reducing the thickness of the parts other than the inner-side interposed portion 64 contributes to a reduced material cost. In particular, reducing the thickness of a part interposed between the surfaces of the first and second end portions 27, 28 of the coil 24 and respective inner surfaces of the end wall 34 and peripheral wall 32 in the stator frame 30 enables a superior heat radiation performance to be realized. Moreover, even if cracks are generated in the above parts, which are separate from the rotor 10, there will be little possibility that the cracks exert any influence on an operation of the rotor 10.

Although the second resin part 62 has a portion 66 close to the rotor 10, the portion 66 covering the inner surface 28*b* of the second end portion 28 of the coil 24, the portion 66 can receive only a small mechanical load as compared with a mechanical load received by the inner-side interposed portion 64 close to the load side end portion 12*a* and in contact with the first boss portion 36, because the portion 66 is far from the load side end portion 12*a*. The portion 66 is thus unlikely to be cracked though being thinner than the inner-side interposed portion 64. In addition, the outward separation of the portion 66 from the outer peripheral surface of the second boss portion 46 allows the end cover 40 to be easily attached to and detached from the stator frame 30.

Furthermore, in the motor according to this embodiment, the covering portion 65 of the first resin part 61, covering the inner surface of the first end portion 27 of the coil 24 between the inner-side interposed portion 64 and the stator core 22, can be also prevented from crack more reliably because the covering portion 65 is so shaped as to have a thickness decreases continuously from the inner-side interposed portion 64 toward the stator core 22. For example, if the covering portion 65 had a constant inner diameter, which is smaller than the inner diameter of the inner-side interposed portion 64 (that is, an outer diameter of the first boss portion 36) and there existed a step between the covering portion 65 and the inner-side interposed portion 64, the step changing the inner diameter of the covering portion 65 discontinuously, the step could generate stress concentration at the position thereof. In contrast to this, the above-mentioned shape of the covering portion 65 having a continuously varying thickness can suppress stress concentration to thereby decrease the possibility of cracks in the first resin part 61.

Meanwhile, the shape of the coil 24 where the second end portion 28 thereof outwardly bulges so as to locate the entire outer surface 28*a* of the second end portion 28 radially outside the outer surface 25*a* of the part 25 disposed in the stator core 22 allows the second resin part 62 interposed between the outer surface 28*a* and the inner peripheral surface 32*a* of the upper portion of the peripheral wall 32 to have a reduced thickness, thereby enabling heat radiation from the second end portion 28 to the exterior of the stator frame 30 to be effectively advanced.

Figure 3:
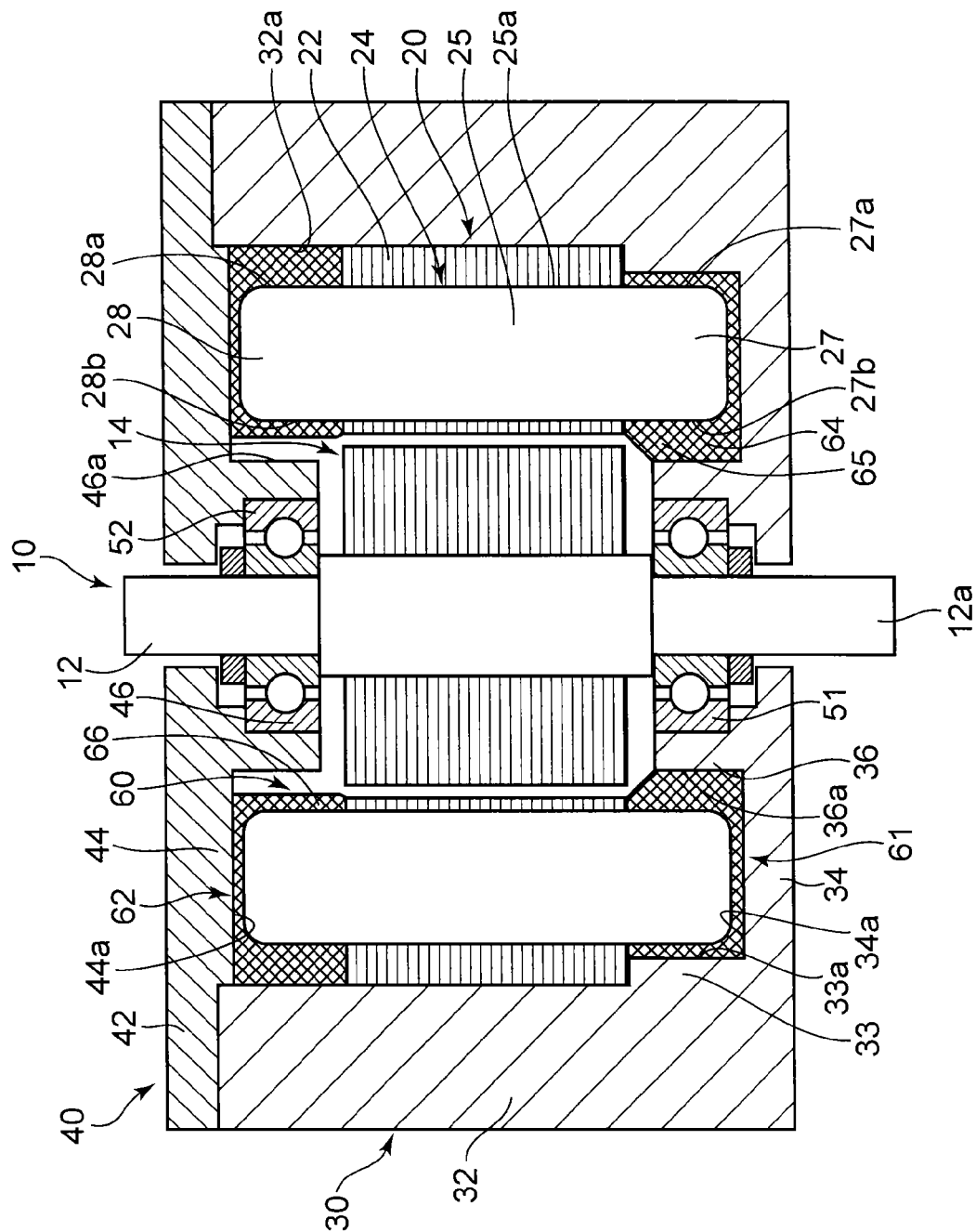
FIG. 3 is a sectional front view of a motor according to a second embodiment of the present invention.

This effect can be intelligibly explained, for example, by contrast with a second embodiment shown in FIG. 3 including no outward bulge of the second end portion 28. In the second embodiment, the heat radiating resin 60 must include a part having a thickness corresponding at least to the thickness of an outer peripheral portion of the stator core 22, between the outer surface 28*a* of the second end portion 28 and the inner peripheral surface 32*a* of the peripheral wall 32*a*. In contrast to this, the shape of the second end portion 28, outwardly bulging so as to locate the entire outer surface 28*a* of the second end portion 28 close to the inner peripheral surface 32*a* as shown in FIG. 1, enables the thickness of the resin interposed between the outer surface 28*a* and the inner peripheral surface 32*a* to be reduced regardless of the thickness of the outer peripheral portion of the stator core 22.

The posture in which the motor according to the present invention should be disposed is not limited to a vertical attitude but the invention can be applied to a motor disposed in a lateral attitude. Besides, the term "motor" according to the invention intends to broadly include one operated on substantially identical principles to a motor, for example, including a power generator and a generator motor that operate on substantially identical principles to a motor.

As described above, the present invention provides a motor which comprises a stator including a coil, a stator frame accommodating the stator and a heat radiating resin disposed in the stator frame, the motor being capable of effectively cooling the coil without a large increase in cost while avoiding operation defects in a rotor caused by cracks in the resin.

The present invention provides a motor which includes: a rotor capable of rotating about a specific rotary central axis, the rotor including one axial end portion as a load side end portion adapted to be connected to a mechanical load; a stator including a stator core disposed around the rotor and a coil supported by the stator core, the stator adapted to form a magnetic field that applies a rotary force to the rotor when the coil is energized; a stator frame having an opening on an opposite side to the load side end portion of the rotor, the opening directed parallel to the axial direction of the rotor, the stator frame accommodating the stator and holding the stator core; an end cover attached to the stator frame so as to close the opening in the stator frame; a first bearing and a second bearing held by the stator frame and the end cover, respectively, to rotatably support the rotor in respective axially different positions; and a heat radiating resin disposed in the stator frame so as to transfer heat generated in the coil to the stator frame to advance heat radiation. The coil of the stator includes a first end portion projecting beyond the stator core toward the load side end portion in the axial direction of the rotor and a second end portion projecting beyond the stator core in a direction opposite to the first end portion in the axial direction of the rotor. The stator frame includes a peripheral wall surrounding the stator with a radial gap between the peripheral wall and respective outer surfaces of the first and second end portions of the coil, and an end wall located on an opposite side to the opening in the stator frame and integrally connected to the peripheral wall. The end wall includes a central part projecting inwardly in the axial direction of the rotor beyond a peripheral part thereof to form a first boss portion that holds the first bearing. The end cover includes a central part projecting inward in the axial direction of the rotor beyond a peripheral part thereof to form a second boss portion that holds the second bearing. The stator is disposed in the stator frame such that the first end portion of the coil is interposed between the first boss portion and the peripheral wall of the stator frame and the second end portion is interposed between the second boss portion and the peripheral wall of the stator frame. The heat radiating resin includes a first resin part covering a surface of the first end portion of the coil and making close contact with an inner surface of the stator frame and a second resin part covering a surface of the second end portion of the coil and separating from an outer peripheral surface of the second boss portion of the end cover, the first resin part including an inner-side interposed portion interposed between an inner surface of the first end portion of the coil and an outer peripheral surface of the first boss portion, the heat radiating resin having such a shape that the inner-side interposed portion has a thickness greater than a thickness of other portion than the inner-side interposed portion in the heat radiating resin.

According to the motor configured as described above, the characteristic shape of the heat radiating resin disposed in the stator frame allows both of preventing the rotor from operation defects due to cracks in the heat radiating resin and securing a superior heat radiation performance to be achieved.

Specifically, in the first resin part of the heat radiating resin close to the load side end portion of the rotor, giving the inner-side interposed portion interposed between the inner surface of the first end portion of the coil and the outer peripheral surface of the first boss portion a large thickness prevents the inner-side interposed portion from cracks due to a mechanical load exerted on the inner-side interposed portion, the mechanical load being originally applied to the first boss portion, for example, a load generated by vibration of the rotor, thus preventing that fragments of the heat radiating resin generated by the cracks involves operation defects in the rotor. Furthermore, since the inner-side interposed portion of the first resin part is far from the outer surface of the stator frame and therefore plays a comparatively small role in radiating heat to the exterior of the stator frame, the influence which the increase in the thickness of the inner-side interposed portion exerts on the heat radiation performance is small. Besides, the close contact of the inner-side interposed portion with both of the outer peripheral surface of the first boss portion and the inner surface of the first end portion (in other words, the inner-side interposed portion continues from the outer peripheral surface of the first boss portion to the inner surface of the first end portion) also contributes to an enhanced strength of the inner-side interposed portion.

On the other hand, reducing the thickness of the parts of the heat radiating resin other than the inner-side interposed portion permits material costs to be reduced. In particular, the reduction in the thickness of the portion interposed between the surfaces of the first and second end portions of the coil and respective inner surfaces of the end wall and peripheral wall of the stator frame enables a superior heat radiation performance to be secured. Moreover, the parts, separating from the rotor, receive only a relatively small mechanical load from the rotor; therefore, even if the parts are cracked, the possibility that the cracks exert any influences on the operation of the rotor is quite remote.

The portion of the second resin part of the heat radiating resin, covering the inner surface of the second end portion of the coil, is separate from the outer peripheral surface of the second boss portion of the end cover, thus enables the end cover to be easily attached to and detached from the stator frame. Besides, the second resin part, located on the opposite side to the load side end portion of the rotor, is unlikely to be cracked even though the second resin part has a thickness smaller than the thickness of the inner-side interposed portion close to the load side end portion.

The peripheral part of the second boss portion of the end cover may be either separate from or in contact with the second resin part in the radial direction of the rotor. In the case of priority to reliable prevention of the second resin part from cracking, it is preferable that the peripheral part is separate from the second resin part, while, in the case of priority to improving heat radiation, it is preferable that the peripheral part contacts the second resin part.

The first resin part preferably has a covering portion which covers the inner surface of the first end portion of the coil, the covering portion being shaped so as to have a thickness decreasing continuously from the inner-side interposed portion toward the stator core. This shape can suppress stress concentration in the first resin part in comparison with a shape, for example, including a discontinuous location, for example, a step, between the inner-side interposed portion and the other portion, thereby further reducing the possibility of cracks generated in the first resin part.

It is preferable that the second end portion of the coil has a shape bulging so as to locate an outer surface of the second end portion radially outside an outer surface of a part of the coil disposed in the stator core, and that the second resin part is interposed between the outer surface of the second end portion and an inner peripheral surface of the peripheral wall. The shape of the second end portion allows the thickness of the second resin part interposed between the outer surface of the second resin part and the inner peripheral surface of the peripheral wall to be reduced over the entire outer surface, thereby enabling heat radiation from the second end portion to the exterior of the stator frame to be advanced effectively.

This application is based on Japanese Patent application No. 2011-235849 filed in Japan Patent Office on Oct. 27, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A motor comprising:
a rotor capable of rotating about a specific rotary central axis, the rotor including one axial end portion as a load side end portion to be connected to a mechanical load;
a stator including a stator core disposed around the rotor and a coil supported by the stator core, the stator to form a magnetic field that applies a rotary force to the rotor when the coil is energized;
a stator frame having an opening on an opposite side to the load side end portion of the rotor, the opening directed parallel to the axial direction of the rotor, the stator frame accommodating the stator and holding the stator core;
an end cover attached to the stator frame so as to close the opening in the stator frame;
a first bearing and a second bearing that are held by the stator frame and the end cover, respectively, to rotatably support the rotor in respective axially different positions; and
a heat radiating resin disposed so as to transfer heat generated in the coil to the stator frame to advance heat radiation, wherein:
the coil of the stator includes a first end portion projecting beyond the stator core toward the load side end portion in the axial direction of the rotor and a second end portion projecting beyond the stator core in a direction opposite to the first end portion in the axial direction of the rotor;
the stator frame includes a peripheral wall surrounding the stator with a radial gap between the peripheral wall and respective outer surfaces of the first and second end portions of the coil, and an end wall located on an opposite side to the opening in the stator frame and integrally connected to the peripheral wall, the end wall including a central part projecting inwardly in the axial direction of the rotor beyond a peripheral part thereof to form a first boss portion that holds the first bearing;

the end cover includes a central part projecting inward in the axial direction of the rotor beyond a peripheral part thereof to form a second boss portion that holds the second bearing;

the stator is disposed in the stator frame such that the first end portion of the coil is interposed between the first boss portion and the peripheral wall of the stator frame and the second end portion is interposed between the second boss portion and the peripheral wall of the stator frame; and the heat radiating resin includes a first resin part covering a surface of the first end portion of the coil and making close contact with an inner surface of the stator frame and a second resin part covering a surface of the second end portion of the coil and separating from an outer peripheral surface of the second boss portion of the end cover, the first resin part including an inner-side interposed portion interposed between an inner surface of the first end portion of the coil and an outer peripheral surface of the first boss portion, the heat radiating resin having such a shape that the inner-side interposed portion has a thickness greater than a thickness of other portion than the inner-side interposed portion in the heat radiating resin.

2. The motor according to claim 1, wherein the first resin part has a covering portion which covers the inner surface of the first end portion of the coil, the covering portion being shaped so as to have a thickness decreasing continuously from the inner-side interposed portion toward the stator core.

3. The motor according to claim 1, wherein the second end portion of the coil has a shape bulging so as to locate an outer surface of the second end portion radially outside an outer surface of a part of the coil disposed in the stator core, and the second resin part is interposed between the outer surface of the second end portion and an inner peripheral surface of the peripheral wall.

* * * * *